Jan. 30, 1951 — T. W. MOORE — 2,539,747
HIGH-SPEED ROTOR FOR DYNAMOELECTRIC MACHINES
Filed Aug. 29, 1949 — 2 Sheets-Sheet 1
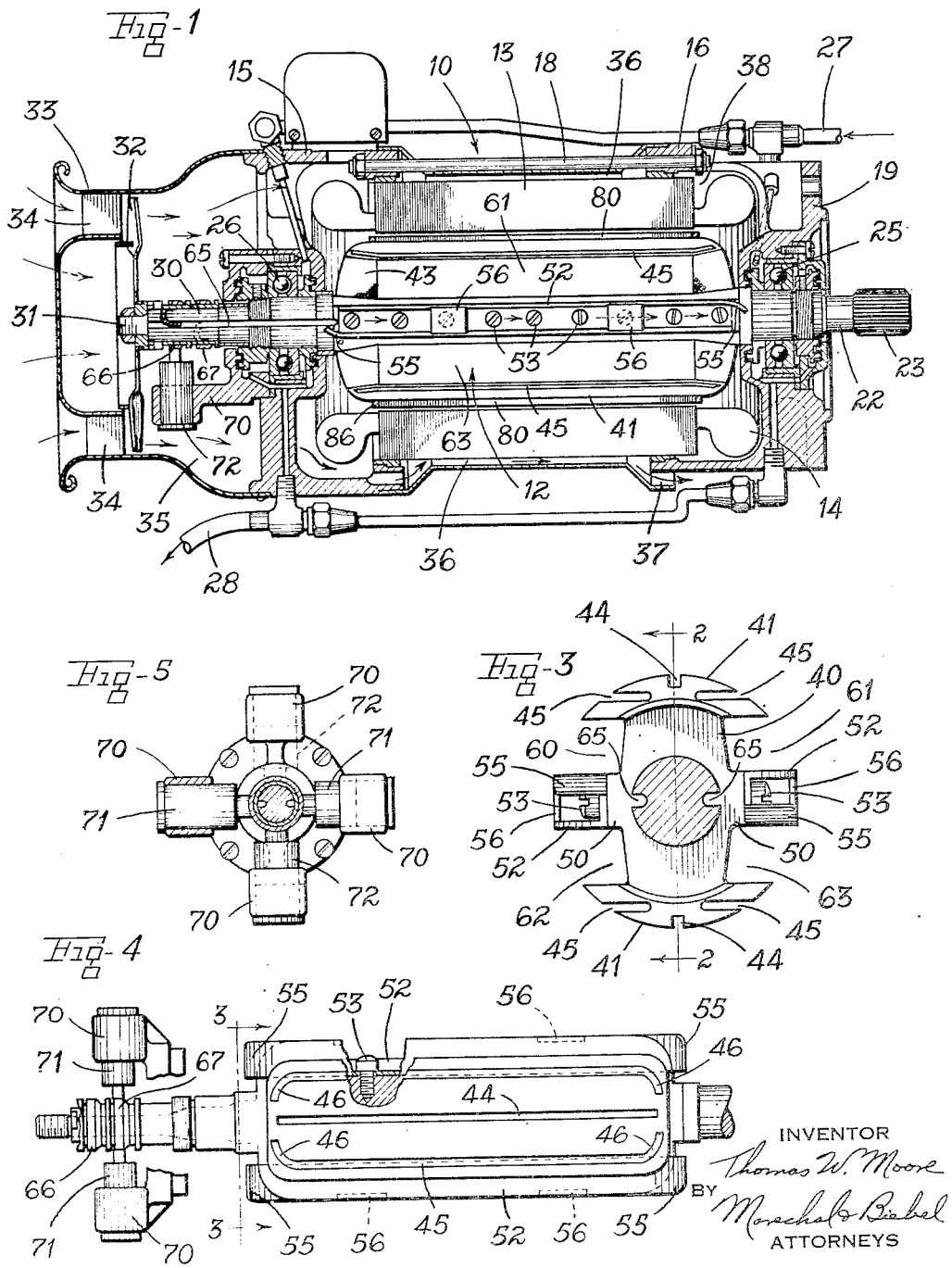
INVENTOR
Thomas W. Moore
BY Moschel & Biebel
ATTORNEYS Jan. 30, 1951 T. W. MOORE 2,539,747
HIGH-SPEED ROTOR FOR DYNAMOELECTRIC MACHINES
Filed Aug. 29, 1949 2 Sheets-Sheet 2
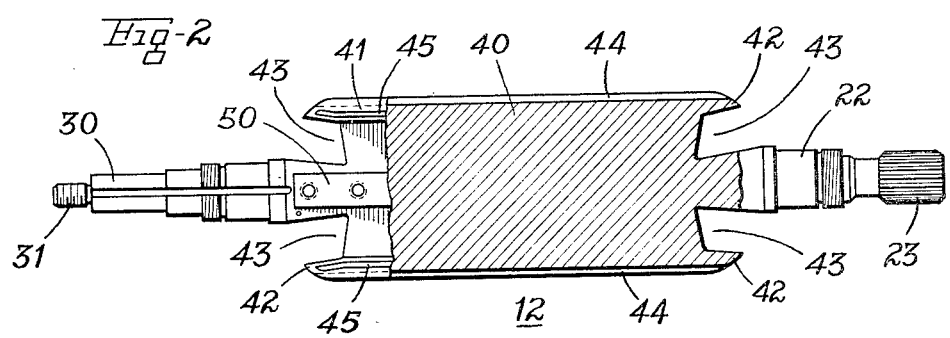
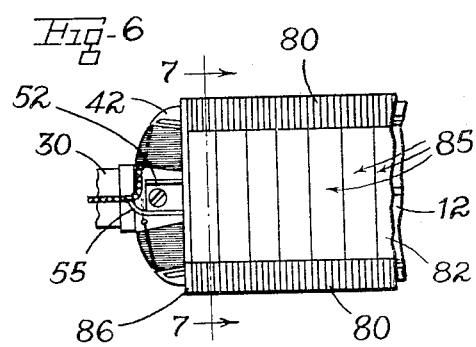
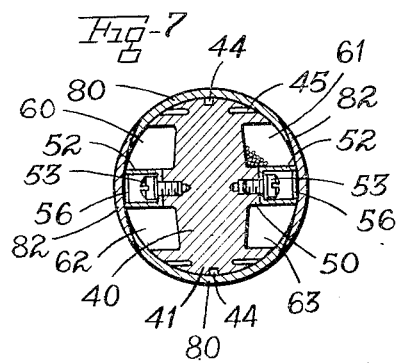
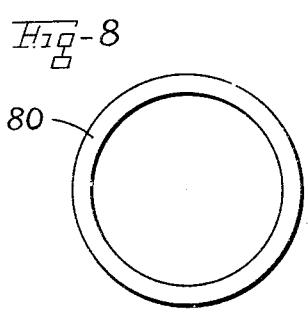
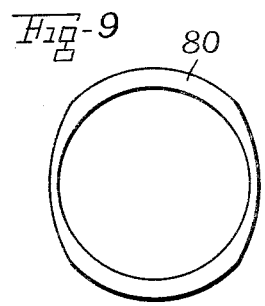
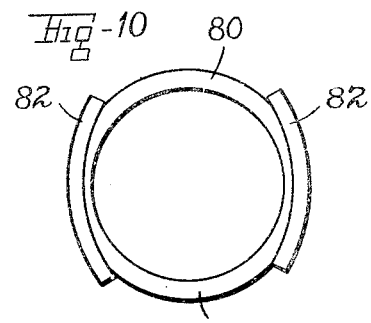
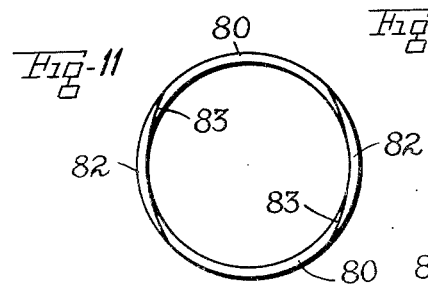
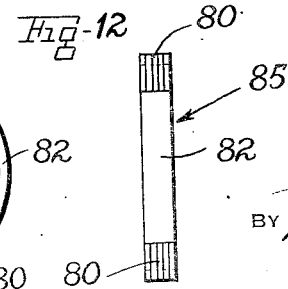
INVENTOR
Thomas W. Moore
BY Marechal & Biebel
ATTORNEYS Patented Jan. 30, 1951

2,539,747

UNITED STATES PATENT OFFICE 2,539,747

HIGH-SPEED ROTOR FOR DYNAMO-ELECTRIC MACHINES

Thomas W. Moore, Dayton, Ohio, assignor to The Leland Electric Company, Dayton, Ohio, a corporation of Ohio Application August 29, 1949, Serial No. 112,925

9 Claims. (Cl. 171—252)

This invention relates to dynamoelectric machines and more particularly to the construction of rotors for such machines.

In dynamoelectric machines intended for high speed operation there are special problems of both a mechanical and an electrical nature because of the high centrifugal forces which are involved. In a machine operating at 24,000 R. P. M., for example, the centrifugal force developed by one ounce on the circumference of the rotor may be of the order of 1500 pounds. With such large forces being involved it is highly important that the rotor be of such construction that it will properly withstand these forces, particularly with regard to the windings which must be so secured that they will not move or rub, which would be likely to lead to breakdown of the insulation, or to mechanical unbalance of the rotor, either of which conditions would be quite detrimental.

The control of the flux distribution is also important to insure good stability in the flux pattern with the development of a proper wave form and the avoidance of wide changes under varying loads. The proper cooling of the machine is also highly important, particularly in order to make it possible to develop a maximum output while avoiding a temperature rise which might be dangerous.

It is therefore the object of the invention to provide a dynamoelectric machine in which these desired conditions are obtained. It is also an object to provide such a machine which is relatively light in weight such that the machine is well adapted for aircraft use, and is strong and reliable in operation.

Other objects and advantages will be apparent from the following description, the accompanying drawings, and the appended claims.

In the drawings—

Fig. 1 is a sectional view through a complete dynamoelectric machine constructed in accordance with the present invention.

Fig. 2 is a view of the rotor core, partially in elevation and partially in section.

Fig. 3 is an end view through the shaft of the rotor on the line 3—3 of Fig. 4.

Fig. 4 is an elevation view of the rotor in its completed state except for the presence of the windings, certain parts being broken away to show the construction of the channel members.

Fig. 5 is an end elevational view showing the brush holding assembly.

Fig. 6 is a broken elevational view of the completed rotor with the windings in place.

Fig. 7 is a sectional view through the rotor on the line 7—7 of Fig. 6.

Figs. 8, 9 and 10 are planned views showing successive steps in the fabrication of the ring assemblies which are mounted upon the core of the rotor and Fig. 11 is a planned view and Fig. 12 is a side elevational view of a completed ring assembly in accordance with the invention.

Referring to the drawings which disclose a preferred embodiment of the invention, the machine as a whole is shown in Fig. 1 for illustrative purposes and comprises a stator indicated generally at 10 and the rotor at 12. The stator carries the field structure 13 which is preferably laminated in the usual way and which receives the windings 14 therein. End plates 15 and 16 are bolted in position at opposite ends of the laminations, being held by bolts 18. The end plate 16 is formed with an end flange 19 which may be bolted against a housing for the drive member, such as an engine, a gear casing, or the like. The stator has been described only generally as the invention is directed primarily to the novel construction of the rotor. Also for purposes of illustration the machine will be described as an alternator, although the invention may likewise be embodied in a motor.

The rotor 12 has a projecting shaft 22 at one end which carries a splined connection 23 serving as the drive for engagement with the source of mechanical power. The shaft 22 is journaled in anti-friction bearings 25 at one end 26 at the other, suitably supported in the end plates 16 and 15, respectively, of the stator. Lubrication is supplied to the bearings under pressure from a lubricant supply line 27, and is withdrawn through line 28, by suitable vacuum pump means.

The opposite end of the rotor shaft is also extended as indicated at 36 and has a threaded end 31 on which are mounted a plurality of fan blades 32 which operate within a fan housing 33 secured to the end plate 15. Baffle members 34 direct the flow of air into the fan blades, the housing forming a chamber 35 from which the flow of air is distributed to both the rotor and the stator. Air flow passages 36 are formed in the stator, and as shown in Fig. 1 they are of reduced thickness so that the flow is brought into close contact with the stator laminations, this having been found to provide a highly effective cooling flow to dissipate the heat developed in the machine. The cooling flow is discharged through an annular outlet 37, there being a second air chamber 38 at the right-hand end of the machine to which the air flows after passage through the air gap and through the rotor, and from which it is discharged.

Referring now to the construction of the rotor, as shown in Fig. 2 it is formed with a central web member 40 which carries pole extensions 41 thereon. For a two-pole machine there are two such extensions diametrically opposite each other leaving interpole areas therebetween. Preferably the pole extensions are formed integrally with the web, by machining the piece to the desired shape, thereby assuring uniformity and maximum rigidity in the finished article. As shown in Fig. 2, the ends 42 of the pole extensions overhang the web 40 forming recesses 43 for the end turns of the windings.

Each of the pole extensions is provided with a central slot 44 and two laterally extending slots 45, as shown in detail in Fig. 3. The slots 45 have a curved portion 46 adjacent either end as shown in Fig. 4. The slots 45 are relatively deep and together with the central slot 44 forms barriers which force the flux into a definite pattern of distribution, concentrating the flux centrally into two portions on opposite sides of the central plane, in accordance with the geometry of the integral section which remains. The effect of such slots is therefore to determine the original flux pattern, and to tend to maintain that flux distribution notwithstanding changes in load conditions and the like during use, thereby assuring the establishment and maintenance of both proper wave form in the generated voltage and proper retention of that wave form under varying conditions of operation.

The web 40 is also formed with a pair of oppositely extended bosses 50 midway between the pole extensions, these bosses serving as a support for channel shaped members 52 which are bolted to the bosses by a series of bolts 53. The channel members are of such radial extent that they extend outwardly substantially to the same circumference as the pole extensions 31, and are formed of suitable non-magnetic material such as copper-chromium. One flange adjacent each end of the channel is curved inwardly as shown at 55 to facilitate the in-flow and out-flow of cooling air into the open channels when the rotor is in operation. A plurality of stiffening members 56 are provided at spaced points along the length of the channel to reinforce the same while retaining an essentially open construction thereof.

The channels divide the interpole areas into a plurality of slots 60—63, which serve to receive the windings for the rotor. There are two windings, one extending through slots 60 and 61, the other winding lying in slots 62 and 63. The shaft portion 30 of the rotor is formed with diametrically opposite grooves 65 and connections from the windings extend through these grooves through a pair of slip rings in 66, 67, on the overhanging end of the shaft.

Brushes are provided for establishing connection with the slip rings, the end plate 15 being formed with bracket arms 70 in which there are received opposite pairs of brushes 71 and 72. It is found that a better operating condition is obtained where two diametrically opposite brushes connected together are provided, such connection assuring better contact under high speed operating conditions and maintaining good connections at all times notwithstanding possible vibration or the like.

With a machine having an output for example of 50 kw., and a frequency of 400 cycles at 24,000 R. P. M., the rotor has an outside diameter of 3.37 inches, with a magnetic length of 6½ inches. Under these conditions one ounce on the periphery of the rotor develops a centrifugal force of the order of 1500 pounds, that is, is subject to a force of approximately 24,000 g. To withstand such large forces and to provide for maintaining the windings in predetermined definite position without movement during operation, a ring assembly is provided which completely encloses both the pole extensions and the interpole areas or slots therebetween. It is necessary to use a magnetic material over the poles and non-magnetic material between the poles. It is also desirable to laminate the magnetic material in order to reduce the effect of eddy currents therein. It is important therefore to provide such a composite structure which will not only withstand the high centrifugal stresses developed within its own structure, but also those which are developed within the windings and other portions of the core, as well as maintaining proper electrical and magnetic properties in the entire rotor construction.

For this purpose a ring assembly structure is provided, the several stages in the production being indicated in Figs. 8 through 12. As shown in Fig. 8, a solid annular ring 80 is made from a material such as chrome nickel steel having a high yield strength and preferably heat treatable after brazing. The magnetic properties are purposely such that the material saturates at around 40% of normal magnetic materials since in the position where this part is used the flux densities are about one third of those in the balance of the magnetic circuit. The saturation of this part of the magnetic circuit aids in the maintenance of proper wave form and reduction of magnetic leakage. The electrical resistivity is also very high, which reduces the rotor surface loss.

The axial thickness of the ring is rather small since the use of a laminated structure further reduces losses. Dimensions of $1/32$ to $1/8$ inch have been found satisfactory, depending upon the fabrication procedure. The ring 80 is machined so as to remove sections at diametrically opposite points, the ring initially having a thickness in the radial direction substantially greater than that desired in the finished assembly. As a matter of convenience these sections are arcs of a circle having a larger radius thna that of the ring (Fig. 9).

Sectors 82 of a non-magnetic material, preferably also heat treatable after brazing, are secured to these machined surfaces by brazing. The axial length of these sectors is preferably greater, around ¾ inch, so that by this means several of the ring laminations are secured together in the form shown in Fig. 10. The assembled ring is then machined inside and out, leaving a section as shown in Fig. 11, having alternate magnetic (80) and non-magnetic (82) sections adapted to be assembled upon the wound rotor core. The line of contact between the two sections has an area indicated at 83 which is several times that of either section and, therefore, allows the use of a conventionally low tensile brazing or other joining process while still maintaining full strength in the finished ring. The inside periphery of the ring is machined until the material 82 just breaks through. This gives the best strength condition and reduces unnecessary magnetic leakage.

The completed ring assemblies as shown at 85 (Fig. 12) are subjected to a heat treating procedure designed to bring all components to the highest strength condition. A final machining is then given to the inner surface such as to allow a proper press or shrink fit over the rotor core diameter. Rings are tested for strength prior to assembly to the wound rotor.

It is necessary to wind the rotor in such a manner as to insure against movement under the action of heat and centrifugal force, as any ununiform movement will lead to unbalance and ultimate destruction of the rotor. The coils are, therefore, precision wound so as to avoid crossed wires in so far as possible, preventing pressure concentrations. High temperature impregnating varnish having a high percent solids content is applied to the winding as it progresses, the varnish used having preferably been preheated to drive off all unnecessary volatiles. The insulation used consists of a layer of glass and/or asbestos fabric cemented to the core by a high temperature adhesive, and a second layer of plastic material such as polytetrafluorethylene, to which the cement will not adhere. The second layer provides a non-adhesive spacer between the coil and core and allows for differential expansion of the copper coil and the iron core, without rupture of the insulation.

The completed winding is assembled in a ring clamp and baked until solid. The clamps are then removed and the retaining rings (Fig. 12) assembled. Slots 45 are provided in the core for magnetic control purposes, but are usable for receiving a single short circuited turn of copper wire functioning as an amortisseur bar. They also provide means for balancing the completed rotor and, if not used for either of these functions, provide additional space for cooling air.

Such ring assemblies are then pressed over the wound rotor, a series of such assemblies being mounted in continuous relation as shown in Fig. 6. Suitable end rings 86 are provided at either end of the assembly to retain the rings in place. If desired the internal diameter of the rings as well as the outer diameter of the finished rotor assembly before the pressing of the rings thereon may be ground to accurate dimensions so that when pressed into place, the rings will be adequately secured in fixed position and in properly oriented relation to the pole extensions, without requiring any additonal retaining means. This is facilitated by heating the ring assemblies and then shrinking them on the core.

Slots 45 also provide a passage for receiving a single turn copper conductor which may be shorted upon itself, such conductor being desirable in some instances and serving as an amortisseur winding.

While the method and form of apparatus herein described constitutes preferred embodiments of the invention it is to be understood that the invention is not limited to this precise method and form of apparatus, and that changes may be made therein without departing from the scope of the invention which is defined in the appended claims.

What is claimed is:

1. A rotor for a dynamoelectric machine comprising a core formed with pole extensions and interpole areas, windings in said interpole areas, and an enclosing ring structure having magnetic portions overlying said pole extensions and non-magnetic portions overlying said interpole areas and retaining said windings in position therein against the action of centrifugal forces.

2. A rotor for a dynamoelectric machine comprising a core formed with pole extensions and interpole areas, windings in said interpole areas, an enclosing ring structure having magnetic portions overlying said pole extensions and non-magnetic portions overlying said interpole areas and retaining said windings in position therein against the action of centrifugal forces, and open channel members extending through said interpole areas for separating said windings and affording a passage for the flow of a cooling medium therethrough.

3. A rotor for a dynamoelectric machine comprising a core of magnetic material having pole extensions and interpole slots, windings in said slots, and a ring structure completely enclosing said pole extensions and said slots retaining said windings in place therein, said ring structure including a magnetic portion overlying said pole extensions and a non-magnetic portion overlying said slots.

4. A rotor for a dynamoelectric machine comprising a core of magnetic material having pole extensions and interpole slots, windings in said slots, and a ring structure completely enclosing said pole extensions and said slots retaining said windings in place therein, said ring structure including a laminated magnetic portion overlying said pole extensions and a non-magnetic portion overlying said slots.

5. A rotor for a dynamoelectric machine comprising a core of magnetic material having pole extensions and interpole slots, windings in said slots, hollow members supported on said core in said interpole slots between adjacent windings and forming axially extending passages for the flow of air therethrough for cooling purposes, and a ring structure completely enclosing said pole extensions, said hollow members and said windings, said ring structure including a magnetic portion overlying said pole extensions and a non-magnetic portion overlying said slots and said hollow member.

6. A rotor for a dynamoelectric machine comprising a core of magnetic material having pole extensions and interpole slots, windings in said slots, and a plurality of individual ring assemblies in axially extending relation completely enclosing said pole extensions and said slots and retaining said windings in place therein, each said ring assembly including a magnetic portion overlying said pole extensions and a non-magnetic portion overlying said slots.

7. A rotor for a dynamoelectric machine comprising a core of magnetic material having pole extensions and interpole slots, windings in said slots, and a plurality of individual ring assemblies in axially extending relation completely enclosing said pole extensions and said slots and retaining said windings in place therein, each said ring assembly including a laminated magnetic portion overlying said pole extensions and a solid non-magnetic portion overlying said slots.

8. A rotor for a dynamoelectric machine comprising an integral core of magnetic material having pole extensions and interpole areas, slots in said pole extensions for controlling the distribution of the flux therein, and a ring structure completely enclosing said pole extensions and said interpole areas, said ring structure including a magnetic portion overlying said pole extensions and a non-magnetic portion overlying said interpole areas.

9. A rotor for a dynamoelectric machine comprising a core of magnetic material having pole extensions and interpole slots, windings in said slots, and a ring structure completely enclosing said pole extensions and said slots retaining said windings in place therein, said ring structure including a magnetic portion overlying said pole extensions and a non-magnetic portion overlying said slots, said magnetic portions being bonded to said non-magnetic portions over areas substantially greater than the thickness of said ring.

THOMAS W. MOORE.

REFERENCES CITED

The following references are of record in the file of this patent:

UNITED STATES PATENTS

| Number | Name | Date |
|---|---|---|
| 541,380 | McLaughlin | June 18, 1895 |
| 1,839,299 | Cornu | Jan. 5, 1932 |
| 1,994,922 | Rose | Mar. 19, 1935 |
| 2,193,675 | Merrill | Mar. 12, 1940 |
| 2,233,924 | McKibben | Mar. 4, 1941 |

FOREIGN PATENTS

| Number | Country | Date |
|---|---|---|
| 444,644 | Great Britain | Mar. 25, 1936 |